July 24, 1951     J. M. TOWLER ET AL     2,561,431

AUTOMATIC HYDRAULICALLY OPERATED CONTROL VALVE

Filed Feb. 17, 1944     2 Sheets-Sheet 1

Inventors
John Maurice Towler
Frank Hathorn Towler
By
their Attorney

Patented July 24, 1951

2,561,431

UNITED STATES PATENT OFFICE 2,561,431

AUTOMATIC HYDRAULICALLY OPERATED CONTROL VALVE

John Maurice Towler, Harrogate, and Frank Hathorn Towler, Otley, England, assignors to Electraulic Presses Limited, Rodley, near Leeds, England Application February 17, 1944, Serial No. 522,844
In Great Britain March 15, 1943

8 Claims. (Cl. 137—153)

This invention relates generally to an automatic master control valve adapted for use in hydraulic systems, and has particular reference to such a valve adapted to control an auxiliary mechanism in the system.

One object of the present invention is to provide an automatic master control valve adapted for use in an hydraulic system which may be used inter alia to control automatically the operation of an unloading valve so that said valve will unload a pump supplying pressure liquid to a hydraulic cylinder, such as the cylinder of an hydraulic press when the pressure in said cylinder reaches a predetermined figure and to load the pump again as soon as the pressure in the cylinder falls below the predetermined figure.

A further object of the invention is to provide an hydraulically operated master control valve which may be used in the aforesaid system to control automatically the operation of the pump unloading valve or other auxiliary mechanism and in which the pressure liquid which actuates the master control valve is used to actuate the auxiliary mechanism at a predetermined controlled pressure which may be nearly equal to or substantially less than the pressure which actuates the master control valve.

An hydraulic system utilizing the automatic master control valve of the present invention may comprise in combination an hydraulic motor or cylinder, a pump arranged to supply pressure liquid to said motor or cylinder, a non-return valve between said motor and said pump, hydraulically operated auxiliary mechanism serving to control the operation of said motor and/or other mechanism, the said master control valve arranged between the auxiliary mechanism and its supply of pressure liquid for controlling automatically the hydraulic operation of said auxiliary mechanism and a relief valve arranged to control the pressure of the liquid delivered to said auxiliary mechanism by said master control valve by opening automatically under the pressure of said liquid to bye-pass some of said liquid to exhaust when its pressure reaches a predetermined maximum which may be nearly equal to or subtantially less than the pressure of the liquid, which actuates the master control valve.

An automatic control valve according to the present invention and capable of use in the aforesaid system broadly comprises an inlet for pressure liquid a delivery outlet for said liquid to be connected to the apparatus the operation of which is to be controlled, an exhaust outlet, a connection for communication with a relief valve, said connection being arranged between the delivery and exhaust outlets, and a single-acting piston valve which is movable axially, in one direction by hydraulic pressure against opposing spring pressure to connect the inlet to both the delivery outlet and the connection to the relief valve to permit the delivery of liquid through said outlet at a pressure which is controlled by the relief valve, and in the opposite direction to the position of rest by the spring pressure to isolate the delivery outlet from the inlet and to open said delivery outlet to exhaust.

In a system according to one adaptation of the invention pressure liquid is supplied by a continuously running pump and such liquid is delivered both to the cylinder of an hydraulic press and to the control valve past one or more interposed non-return valves. The pressure of this liquid acting on the valve member of the control valve causes the same to open and pass some of the liquid to the auxiliary mechanism which in this embodiment is an automatically operating unloading valve, such, for example, as an unloading valve according to our patent application, Serial No. 522,843, filed February 17, 1944, now Patent No. 2,478,213, granted August 9, 1949. By adjusting the load opposing the opening of the control valve the unloading valve may be caused to function when the pressure in the press cylinder reaches a predetermined figure to unload the pump and so reduce its delivery. When this pressure falls the control valve will automatically close and shut off the delivery of pressure liquid to the unloading valve, which in consequence will load the pump to again restore the pressure in the press cylinder. If the volume of pressure liquid required to operate the unloading valve in a given time is substantially less than the delivery of the pump to the press cylinder, which is usually the case, then the surplus pressure liquid will be discharged past the relief valve, which is set to operate at a lower pressure than the delivery pressure of the pump. This has the advantage of preventing the pressure in the press cylinder from rising appreciably above the predetermined maximum pressure during the time that the pump unloading valve is being operated to shut off the supply to the press cylinder. This is an important advantage because it is frequently desirable to operate the pump unloading valve comparatively slowly, while the pressure rise in the press cylinder may be very rapid.

In a preferred construction of control valve according to this invention the actuating cylinder for the single-acting piston valve, the spring relief valve between the delivery outlet and exhaust and the non-return valve between the pump and the press or other cylinder to be operated are housed in one valve body having four pipe connections. Alternatively the connection to the pump and the non-return valve may be omitted from the control valve by connecting the pump directly to the press cylinder and arranging the non-return valve in said direct connection.

An automatic control valve according to this invention may be arranged to control the admission of pressure liquid to and its exhaust from a series of piston operated bye-pass valves by connecting the delivery outlet of the valve to a manifold serving all the bye-pass valves. Each piston will be opposed by a spring and by setting these to have different loads the valves will be caused to operate selectively in accordance with the spring loadings. Alternatively the same effect may be obtained by making the pistons operating the bye-pass valves of different areas. With such an arrangement a single master control valve may be used to load and unload a series of pumps selectively and said master control valve may be used to be actuated by the pressure in a press cylinder or by the pressure in a delivery main common to said pumps.

In order that the invention may be clearly understood and put into effect a system including one form of the master control valve will now be described by aid of the accompanying drawings in which.

Figure 1:
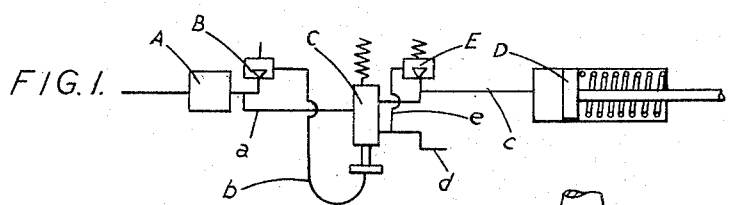
Fig. 1 is a diagram of an hydraulic system according to this invention.

In the system illustrated diagrammatically in Fig. 1 the hydraulic pump A is arranged to deliver primary pressure liquid to a press cylinder, not shown, through a non-return valve B. The pump also delivers directly to the body of the master control valve C through the connection *a* and to the underside of a piston serving to operate the control valve by a further connection *b* taken from a point beyond the non-return valve B. Secondary liquid is delivered by the master control valve at a predetermined pressure to the operating cylinder D of auxiliary mechanism through connection *c*.

Surplus liquid in the connection *c* passes to exhaust outlet *d* by way of branch pipe *e* under control of a spring loaded relief valve E.

With an hydraulic system as above described the pump supplies primary pressure liquid to both an hydraulic press and to the master control valve and at this valve some of this liquid is used to open the valve against a predetermined load to permit liquid at a pressure controlled by the setting of the spring relief valve to pass to the operating cylinder of the auxiliary mechanism.

When the master control valve is open some of the liquid discharged by the pump is free to pass to exhaust by way of the spring relief valve E. In consequence this valve acts to prevent the pressure in the press cylinder from rising rapidly during the operation of the auxiliary mechanism to unload the pump, by providing an alternative path to exhaust for some of the pumped liquid.

Figure 2:
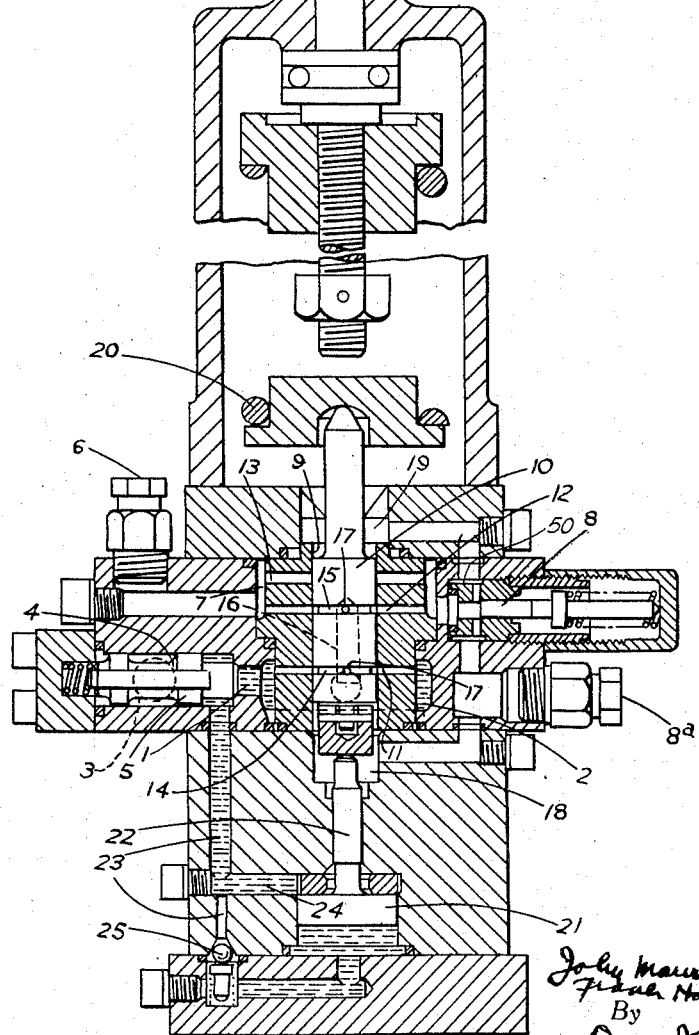
Fig. 2 is a section through the master control valve.

The example of master control valve illustrated in Fig. 2 of the drawings incorporates in its body an inlet 1, for pressure liquid from the pump, opening into an annular chamber 2, an outlet 3 for connection to the press cylinder, said outlet receiving liquid from the chamber 2 through an orifice 4 under the control of a non-return valve 5, an outlet 6 for connection to the auxiliary apparatus, said outlet receiving liquid from a further annular chamber 7, a spring pressed relief valve 8 open to the pressure of the liquid in said annular chamber 7 and an exhaust outlet 8a.

Within the valve body, so as to be surrounded concentrically by the annular chambers 2 and 7, is a bore 9 for the reception in a close sliding fit of a valve plunger or piston 10. The annular chambers are in communication with the interior of the bore 9 by means of two sets of radial passages, one set 11 connecting the bore with the lower annular chamber 2 and the other set 12 connecting the bore with the upper annular chamber 7. A further set of radial passages 13 is provided to connect the chamber 7 with the bore at a point above the set of passages 12 to connect said chamber with the exhaust outlet 8a when the valve plunger is in its lowered position. When the piston valve or plunger 10 is in its lowermost position, it uncovers the inner ends of the radial passages 13, and thus establishes an unrestricted flow passage between the delivery outlet 6 and exhaust outlet 8a, this unrestricted flow passage extending from delivery outlet 6, through chamber 7, through radial passages 13, around the upper reduced end portion of piston valve or plunger 10, and direct to exhaust outlet 8a through the unrestricted passages clearly shown in Fig. 2 of the accompanying drawings, it being noted that there is an annular space 50 surrounding the inner end of relief valve 8 so that the flow passage between said delivery outlet 6 and exhaust outlet 8a is always unrestricted when piston valve or plunger 10 is in its lowermost position and regardless of whether the said valve 8 is in its open or closed position.

Cut in the exterior surface of the valve plunger so as to encircle the same are annular grooves 14 and 15. These grooves are spaced longitudinally a distance equivalent to the distance between the centres of the sets of radial passages 11 and 12 with which they are adapted to register when the valve plunger is in the raised or open position shown in the drawing. The grooves 14 and 15 communicate with a longitudinal passage 16 within the interior of the valve plunger by means of radial holes 17. By this means a passage for liquid is provided between the annular chambers 2 and 7 when the valve plunger is in the raised position and said chambers are isolated from each other when the valve plunger is in the lowered position, and said plunger is always in hydraulic balance laterally.

At opposite ends of the valve plunger are spaces 18 and 19 which are always in free communication with the exhaust outlet 8a. The plunger is therefore always in hydraulic balance longitudinally.

In the drawing the valve plunger is shown in the raised position and passing liquid at a predetermined pressure from the pump to the auxiliary apparatus. The movement of the plunger to the raised position is effected against a spring 20 by pressure liquid acting upon the lower or full pressure side of a piston 21, the stem 22 of which enters the space 18 and abuts against the lower end of the valve plunger. Alternatively the stem 22 may be made integral with the valve plunger.

The pressure liquid which acts against the underside of the piston 21 is derived from the annular chamber 2 and for this purpose this chamber is connected with both ends of the cylinder in which the piston works by passages 23 and 24. In the passage 23 is positioned a non-return valve 25 which serves to pass liquid freely to the underside of the piston but which closes automatically under the influence of its spring, when the pressure falls, to close the passage and prevent the liquid from escaping from the lower end of the aforesaid cylinder. The liquid thus trapped is permitted to escape at a relatively slow rate by leakage past the piston to the upper end of the cylinder to join the liquid in the chamber 2 for which purpose the piston 21 is given sufficient clearance in its cylinder to permit the said leakage to take place at the desired rate.

By means of the arrangement just described the pressure liquid is permitted to act against an effective area of the piston 21 equal to the area of the stem 22 and when this pressure is sufficient to overcome the resistance of the spring 20 the valve plunger is forced upwards to the position illustrated in the drawings. By thus permitting the pressure liquid to have free access to the underside of the piston the valve plunger is rendered fully sensitive to and is immediately actuated by a sudden increase in the pressure of said liquid and by restricting the escape of the liquid from the underside of the piston the return movement of the valve plunger by the spring is damped to prevent hunting.

As will be seen from reference to the drawing the spring loading on both the valve plunger and the relief valve 8 are independently adjustable so as thereby to vary the pressure of the liquid passing to the cylinder of the auxiliary apparatus and of that passing to the press cylinder independently.

Figure 3:
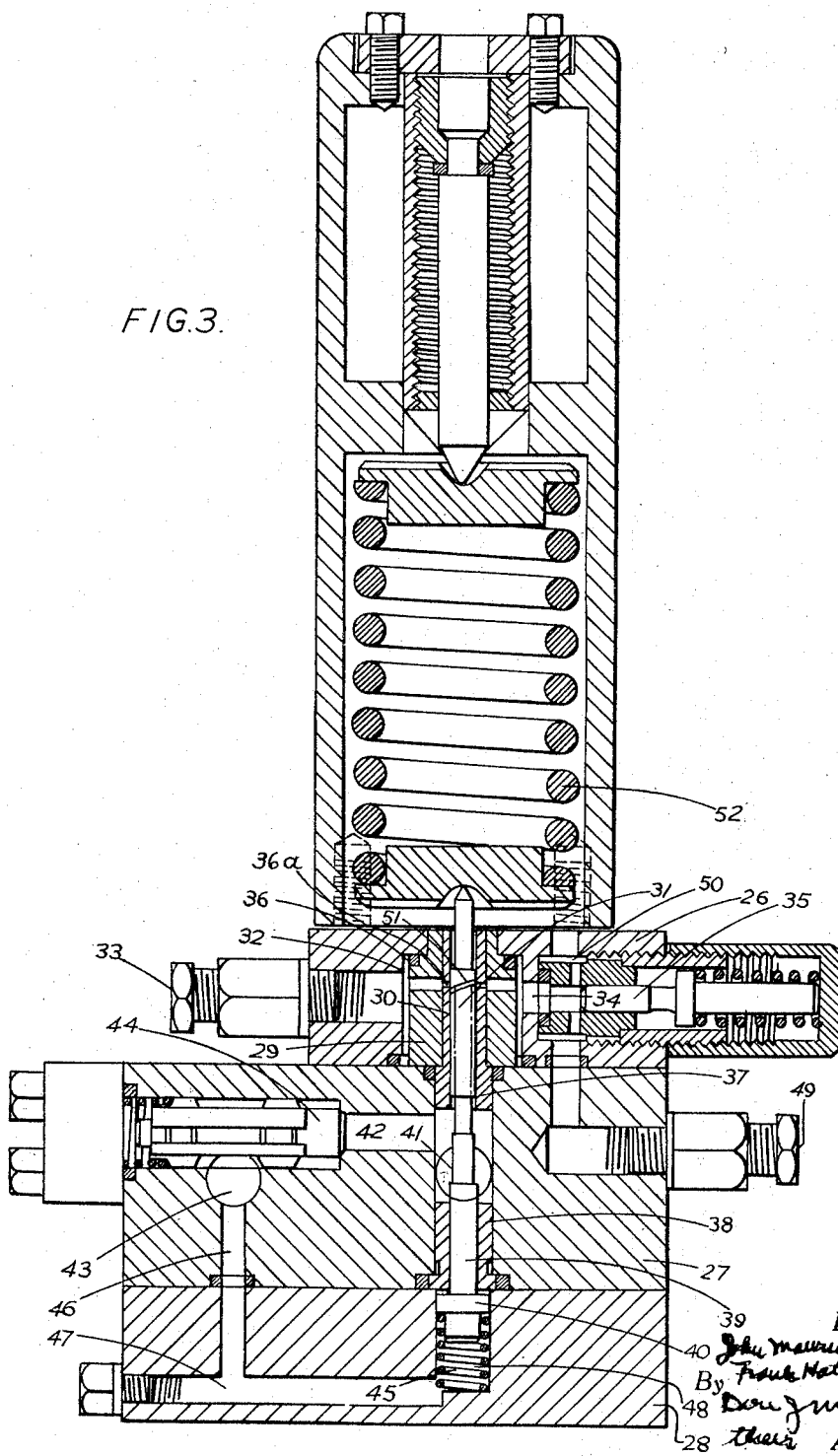
Fig. 3 is a view similar to Fig. 2 illustrating a modified form of master control valve.

The modified control valve illustrated in Fig. 3 comprises a body built up of three superimposed sections, an upper section 26, an intermediate section 27 and a lower section 28. These three sections are each machined to provide bores which align on assembly of the sections. In the bore of the upper section there is fitted a bush 29, which is bored to receive a sleeve 30 which is lapped to receive in an oiltight sliding fit the valve plunger 31. The aforesaid bush, for a portion of its length is of smaller diameter than the bore in which it is positioned so as to provide a surrounding annular space 32 which is open on one side to an outlet 33 adapted to be connected to the auxiliary mechanism to be operated and on another side to an outlet 34 which communicates with a relief valve 35. The interior of the sleeve containing the valve plunger communicates with this annular space by means of registering transverse holes or passages 36 and 36a, respectively provided in the bush and the sleeve.

The intermediate section of the valve body has a straight through bore which at its upper end receives an enlarged head 37 on the lower end of the sleeve 30 in the upper section and at its lower end a bush or guide 38 for the stem 39 of the damping piston 40 for the valve plunger. The middle portion of the bore in this intermediate section has on one side an inlet 41 for pressure liquid from a pump and on another side an outlet 42 leading to a further outlet 43 controlled by a non-return valve 44, which further outlet is intended to be connected to a press cylinder or other hydraulic mechanism. The lower section of the valve body is bored to receive the damping piston 40 which on its outer side is supported by a light spring 45. Passages 46 and 47 in the intermediate and lower sections serve to connect the pump delivery inlet to the space 48 on the under or outer side of the damping piston at a point beyond the non-return valve 44. The damping piston has slight clearance in its bore to permit liquid to escape from the outer side of the damping piston, past the stem of the piston to the middle portion of the bore in the intermediate section.

An outlet 49 to exhaust is provided in the intermediate section of the valve body. This outlet connects with an annular space 50 surrounding the relief valve and with the upper reduced end of the valve plunger. The outlet 49 is isolated from the annular space 32 surrounding the bush 29 by the relief valve when it is closed.

The valve member in the present embodiment consists of three superimposed and abutting portions, a lower portion constituting the damping piston 40, an intermediate portion constituting the stem 39 of the damping piston and an upper portion or valve plunger proper. The valve plunger is reduced in diameter at both ends and the intermediate part is formed with a helical groove 51 extending from the reduced portion at the inner lower end to within a predetermined distance of the reduced portion at the outer or upper end. There is thus left a plain portion of the plunger between the outer end of the groove and the outer portion of reduced diameter. This portion serves to isolate the inlet 41 from the annular space 32 when the valve plunger is in the lower or closed position. When the plunger is lifted by the pressure of the inlet liquid the upper end of the groove is brought into registration with the radial holes 36 in the sleeve 30 thus permitting the pressure liquid to pass into the annular space and so through the outlet to the auxiliary mechanism. At the same time the relief valve 35 is rendered subject to the pressure of the liquid in the annular space and in consequence it opens to pass some of said liquid to exhaust.

When the valve plunger is in the lowered or closed position the plain portion at its upper or outer end moves below the aforesaid radial holes on the sleeve, so that the then obtruding reduced upper or outer portion of the plunger provides a free passage for liquid across the bush from the auxiliary mechanism to exhaust. The valve plunger is loaded against movement to the open position by a spring 52 the pressure of which is adjustable.

The means for damping the closing movement of the valve plunger may, as an alternative, be that described in connection with our co-pending application, Serial No. 522,842, filed February 17, 1944.

What we claim is:

1. An automatic control valve actuated by hydraulic pressure, comprising an inlet for pressure liquid, a delivery outlet, an exhaust outlet, a piston valve movable between a closed position in which it isolates said inlet from said delivery outlet and an open position in which it establishes communication between said inlet and said delivery outlet to pass pressure liquid to the latter, spring means for normally maintaining said piston valve in the closed position thereof, said piston valve being actuated to the open position upon attainment of a predetermined pressure of the liquid, a spring loaded relief valve adapted to partially by-pass the liquid supplied to the delivery outlet through said piston valve whereby to reduce the pressure of the liquid discharged through the delivery outlet, and a direct communication between the delivery outlet and the exhaust outlet which is closed by the piston valve in the open position of this latter.

2. An automatic valve actuated by hydraulic pressure, comprising a body having an inlet for pressure liquid, an annular chamber connected to said inlet, a delivery outlet, an exhaust outlet, a second annular chamber connected to said delivery outlet and said exhaust outlet, a bore extending axially of both the annular chambers and internally in communication with said exhaust outlet, and two sets of radial passages respectively connecting the annular chambers to said bore, a relief valve in the connection between said second annular chamber and said exhaust outlet a piston valve reciprocable in the bore embodying peripheral grooves adapted to register simultaneously with said sets of radial passages and a passage interconnecting said grooves, said piston valve being movable in one direction in response to a predetermined pressure of the inlet liquid to an open position wherein the grooves thereof are in registration with the sets of radial passages to permit pressure liquid to pass from the first to the second annular chamber, spring means for moving the piston valve to a closed position upon decrease in the pressure of the liquid, and a further set of radial passages for connecting the second annular chamber to the bore, said further set being closed by the piston valve in the open position of this latter and opened to connect the second chamber through said bore to said exhaust outlet when the piston valve moves to its closed position.

3. An automatic control valve as in claim 2 comprising means for damping the movement of the piston valve.

4. An automatic control valve actuated by hydraulic pressure comprising a bore, an inlet for pressure liquid communicating with said bore, a delivery outlet connected with said bore, an exhaust outlet, alternate passageways between the delivery outlet and the exhaust outlet a piston valve movable in said bore adapted to close and open communication between said inlet and said delivery outlet, said piston valve being normally maintained in comunication closing position and being actuated to communication opening position upon attainment of predetermined pressure of the inlet liquid to pass said liquid to the delivery outlet, a relief valve connected with one of the passageways between the delivery outlet and the exhaust outlet and subject to the pressure of the liquid passed by the piston valve when in communication opening position for partially by-passing said liquid to exhaust, and means for permitting discharge of liquid from the delivery outlet to exhaust through the other of said passageways when the piston valve is in its communication closing position.

5. An automatic control valve responsive to hydraulic pressure, comprising an inlet for pressure liquid, a delivery outlet, an exhaust outlet, connections adapted to be established between said delivery outlet and said exhaust outlet, a relief valve associated with one of said connections, and a spring loaded piston valve axially movable in one direction against its spring in response to a predetermined pressure of the inlet liquid to close the other of said connections and to open said one of said connections to concurrently pass inlet liquid both to the delivery outlet and through said one of said connections to the relief valve to partially exhaust said liquid, said piston valve being movable by its spring in the opposite direction upon decrease in the pressure of the liquid to stop the flow of inlet liquid through the delivery outlet and the relief valve and to reopen said other of the connections between the delivery outlet and exhaust.

6. An automatic control valve as in claim 1 comprising a second delivery outlet connected to said inlet, and a non-return valve in the connection between said inlet and said second delivery outlet.

7. An automatic control valve subject to actuation by hydraulic pressure, comprising, in combination, a body structure having an inlet for pressure fluid, a delivery outlet, an exhaust outlet, an unrestricted flow passage open to said exhaust outlet, a restricted flow passage including pressure-maintaining means therein connected to said exhaust outlet, and a valve bore in communication with said inlet, delivery outlet and passages, and a spring-loaded piston valve axially movable in one direction against its spring in response to a predetermined pressure of the inlet liquid into open position, and movable by its spring in the opposite direction upon decrease in the pressure of the inlet liquid into closed position, said piston valve in its open position blocking said unrestricted passage from said delivery outlet and connecting said inlet to said delivery outlet and restricted passage, and in its closed position, blocking said inlet passage from said delivery outlet and restricted passage and connecting said delivery outlet to said unrestricted passage.

8. An automatic control valve according to claim 7 in which said bore has port means open to said delivery outlet and restricted passage and is open to said unrestricted passage, and in which said piston valve in closed position uncovers said port means for communication through said bore with said unrestricted passage, and has a spiral groove in its periphery always open to said inlet and movable into and out of communication with said port means respectively upon movement into and out of open position, said valve in open position blocking said port means from said unrestricted passage.

JOHN MAURICE TOWLER.
FRANK HATHORN TOWLER.

REFERENCES CITED

The following references are of record in the file of this patent:

UNITED STATES PATENTS

| Number | Name | Date |
|---|---|---|
| 174,279 | Moore | Feb. 29, 1876 |
| 1,177,029 | Gamble | Mar. 28, 1916 |
| 2,200,824 | Herman | May 14, 1940 |
| 2,264,375 | Hill | Dec. 2, 1941 |
| 2,286,027 | Towler | June 9, 1942 |
| 2,309,983 | Riddle | Feb. 2, 1943 |
| 2,316,445 | Marshall | Apr. 13, 1943 |